Patented Feb. 5, 1929.

1,701,138

UNITED STATES PATENT OFFICE.

ERNST BURCKHARDT, FRITZ MÜLLER, AND ERNST ROTHLIN, OF BASEL, SWITZERLAND, ASSIGNORS TO THE FIRM OF CHEMICAL WORKS, FORMERLY SANDOZ, OF BASEL, SWITZERLAND.

DERIVATIVES OF THE CINCHONA ALKALOIDS.

No Drawing. Application filed November 30, 1927, Serial No. 236,878, and in Switzerland December 17, 1926.

It has been found that valuable derivatives of the cinchona alkaloids may be obtained if these alkaloids are combined with bile acids to form new basic salts. The following bile acids come into consideration for the present purpose: natural bile acids like glycocholic, taurocholic and desoxycholic acid, the product of saponification of taurocholic and glycocholic acid: cholic acid as well as products of transformation of the latter substance: dehydrocholic and apocholic acid. The cinchona alkaloids may be natural or synthetic ones like quinine, cinchonine, dihydroquinine, dihydrocupreineethyl, -isoamyl, or -n-octylether.

These bile acid salts of cinchona alkaloids may be prepared in a known manner by interaction of the bases and the acids or by double decomposition of suitable salts of these substances.

These new salts possess a stronger antiparasitic action especially on blood parasites than the known salts of cinchona alkaloids.

Examples.

I. 4,2 grammes of methane sulphonate of quinine are dissolved in 100 ccm. of water and poured, whilst stirring, into a solution of 4,5 grammes of sodium cholate in 50 ccm. of water. The quinine cholate precipitates as an amorphous deposit. It is easily soluble in alcohol, methanol and acetone, difficultly soluble in ether and water. The solubility of the salt in water may be increased by the addition of urethane or urea. For analysis the salt has been dried in vacuum at an elevated temperature:

Analysis:
0,2866 grammes neutralized 7,4 ccm. 1/10 N $H_2SO_4$
0,2672 grammes neutralized 6,9 ccm. 1/10 N $H_2SO_4$
Calculated for $C_{20}H_{24}N_2O_2.C_{24}H_{40}O_5$  N=3,73%
Found                                           3,62; 3,62%

From a solution in urea and aqueous alcohol this salt may be obtained in fine, colorless crystal needles on standing for a long time.

II. 4,2 grammes of methane sulphonate of quinine and 4,3 grammes of sodium desoxycholate are allowed to interact as described in Example I. The quinine desoxycholate precipitates as a colorless, amorphous powder and possesses nearly the same solubility properties as quinine cholate.

III. 3,6 grammes of quinidine hydrochloride and 4,5 grammes of sodium cholate are allowed to interact as described in Example I. The new salt separates as an amorphous colorless powder and possesses the same solubility properties as quinine cholate. For analysis it has been dried in a high vacuum at elevated temperature:

0,2772 grammes neutralized 6,6 ccm. of 1/10 N $H_2SO_4$
Calculated for $C_{20}H_{24}N_2O_2.C_{24}H_{40}O_5$  N=3,73%
Found                                            3,34%.

IV. 4,2 grammes of dihydrocupreineethyletherhydrochloride are allowed to interact with 4,5 grammes of sodium cholate as described. The cholate of dihydrocupreineethylether is a colorless, amorphous powder, showing nearly the same solubility properties as quinine cholate. The analysis of a product dried in a higher vacuum at elevated temperature gave the following result:

0,2628 grammes neutralized 6,4 ccm. of 1/10 N $H_2SO_4$
0,2110 grammes neutralized 5,0 ccm. of 1/10 N $H_2SO_4$
Calculated for $C_{21}H_{28}N_2O_2.C_{24}H_{40}O_5$  N=3,56%
Found                                            3,41; 3,32%.

What we claim is:

1. As new articles of manufacture, the basic cinchona alkaloid salts of bile acids constituting amorphous powders easily soluble in alcohol, menthanol and acetone, difficultly soluble in ether and water.

2. As new articles of manufacture the basic cinchona alkaloid salts of natural bile acids constituting amorphous powders easily soluble in alcohol, methanol and acetone, difficultly soluble in ether and water.

3. As new articles of manufacture, the basic cinchona alkaloid salts of saponified bile acids constituting amorphous powders easily soluble in alcohol, methanol and acetone, difficultly soluble in ether and water.

4. As new articles of manufacture, the basic cinchona alkaloid salts of cholalic acid constituting amorphous powders easily soluble in alcohol, methanol and acetone, difficultly soluble in ether and water.

5. As a new article of manufacture, quinine cholate constituting an amorphous powder easily soluble in alcohol, methanol and acetone, difficultly soluble in ether and water.

In witness whereof we have hereunto signed our names this 18th day of November 1927.

ERNST BURCKHARDT.
FRITZ MÜLLER.
ERNST ROTHLIN.